United States Patent
Sato

(10) Patent No.: US 11,113,015 B2
(45) Date of Patent: Sep. 7, 2021

(54) INFORMATION PROCESSING APPARATUS, METHOD OF CONTROLLING THE SAME AND STORAGE MEDIUM

(71) Applicant: CANON KABUSHIKI KAISHA, Tokyo (JP)

(72) Inventor: Kei Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/297,996

(22) Filed: Mar. 11, 2019

(65) Prior Publication Data

US 2019/0286393 A1    Sep. 19, 2019

(30) Foreign Application Priority Data

Mar. 13, 2018  (JP) .............................. JP2018-045926

(51) Int. Cl.
  *G06F 3/12* (2006.01)
  *H04N 1/00* (2006.01)
  *H04N 1/44* (2006.01)

(52) U.S. Cl.
  CPC .......... *G06F 3/1238* (2013.01); *G06F 3/1222* (2013.01); *H04N 1/0048* (2013.01); *H04N 1/4413* (2013.01)

(58) Field of Classification Search
  CPC .................................................... G06F 3/1238
  USPC ....................................................... 358/1.14
  See application file for complete search history.

(56) References Cited

U.S. PATENT DOCUMENTS

| 9,282,214 | B2 | 3/2016 | Sato | |
|---|---|---|---|---|
| 9,602,491 | B2 | 3/2017 | Sato | |
| 2002/0002480 | A1 | 1/2002 | Sato et al. | |
| 2010/0053661 | A1* | 3/2010 | Ushiku | G06K 15/005 358/1.14 |
| 2011/0222100 | A1* | 9/2011 | Tanaka | H04N 1/00413 358/1.14 |
| 2012/0260350 | A1* | 10/2012 | Yamada | H04N 1/00411 726/28 |
| 2013/0159991 | A1 | 6/2013 | Sato | |
| 2015/0172504 | A1* | 6/2015 | Sato | H04N 1/32021 358/1.13 |
| 2015/0235117 | A1 | 8/2015 | Nishiyama | |
| 2017/0142095 | A1 | 5/2017 | Sato | |

FOREIGN PATENT DOCUMENTS

JP           2015-155159 A     8/2015

* cited by examiner

*Primary Examiner* — Jacky X Zheng
(74) *Attorney, Agent, or Firm* — Venable LLP

(57) ABSTRACT

In information processing apparatus, a first setting unit sets whether or not to require user authentication in order for a function of the information processing apparatus to be used. A second setting unit performs, in association with a job type, a restriction setting for restricting a logged-in user from performing an operation with respect to a job corresponding to a user other than the logged-in user. A control unit performs control for enabling the restriction setting for a certain job type in response to a setting for requiring the user authentication being performed.

11 Claims, 9 Drawing Sheets

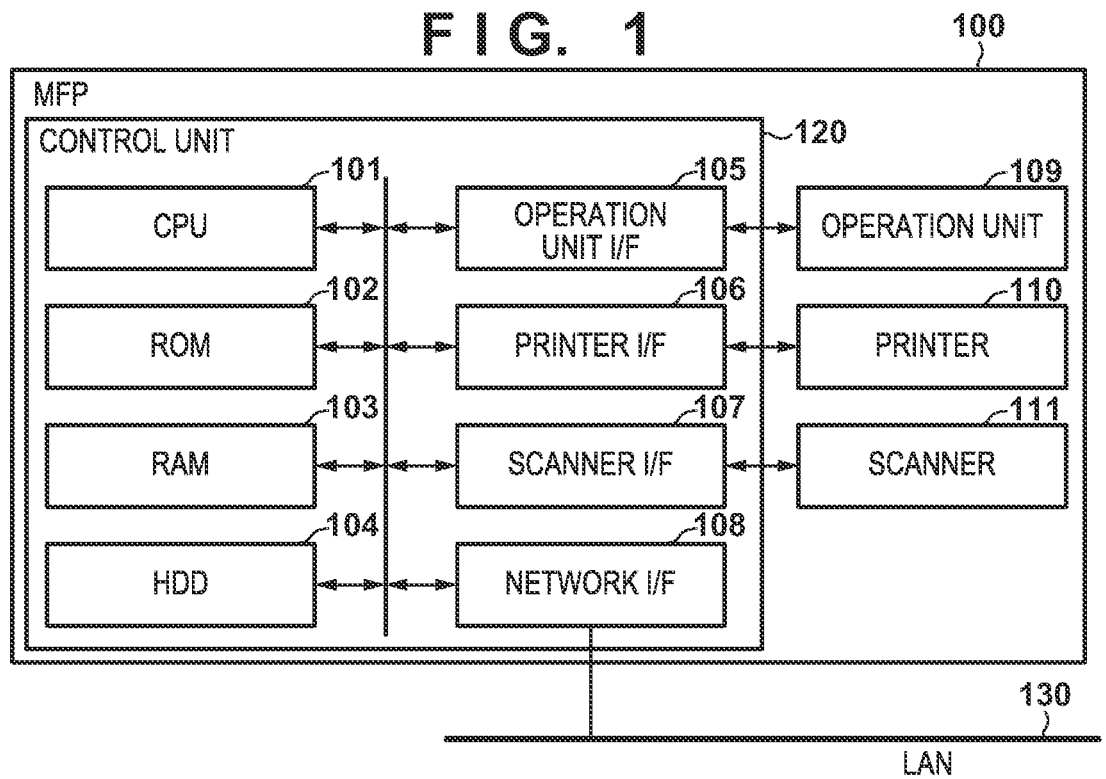
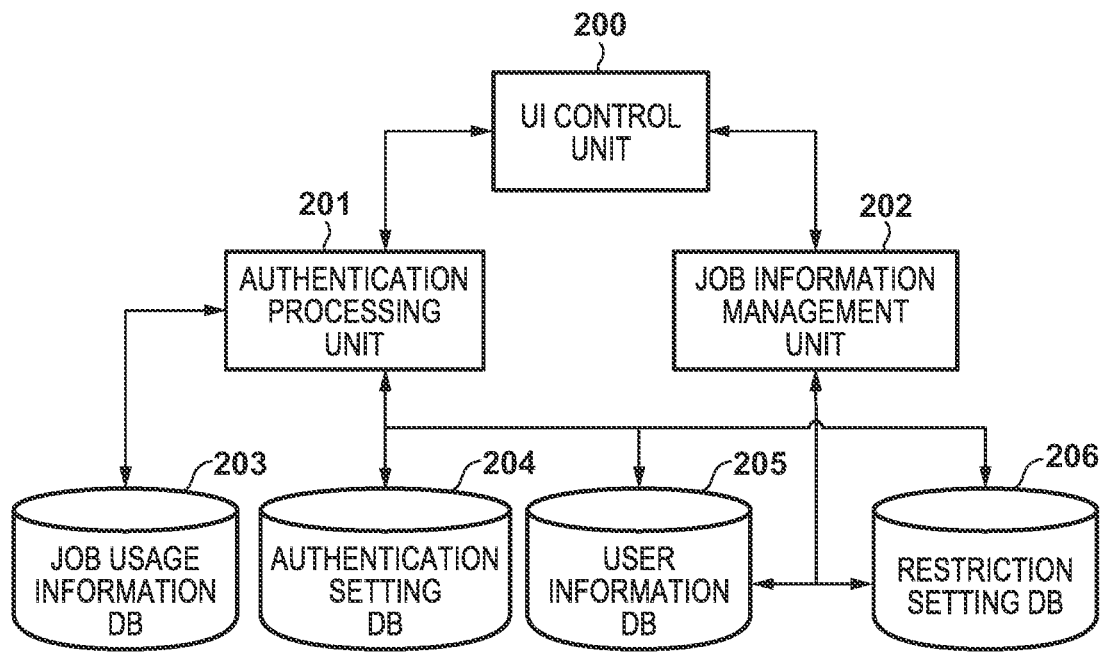

FIG. 3
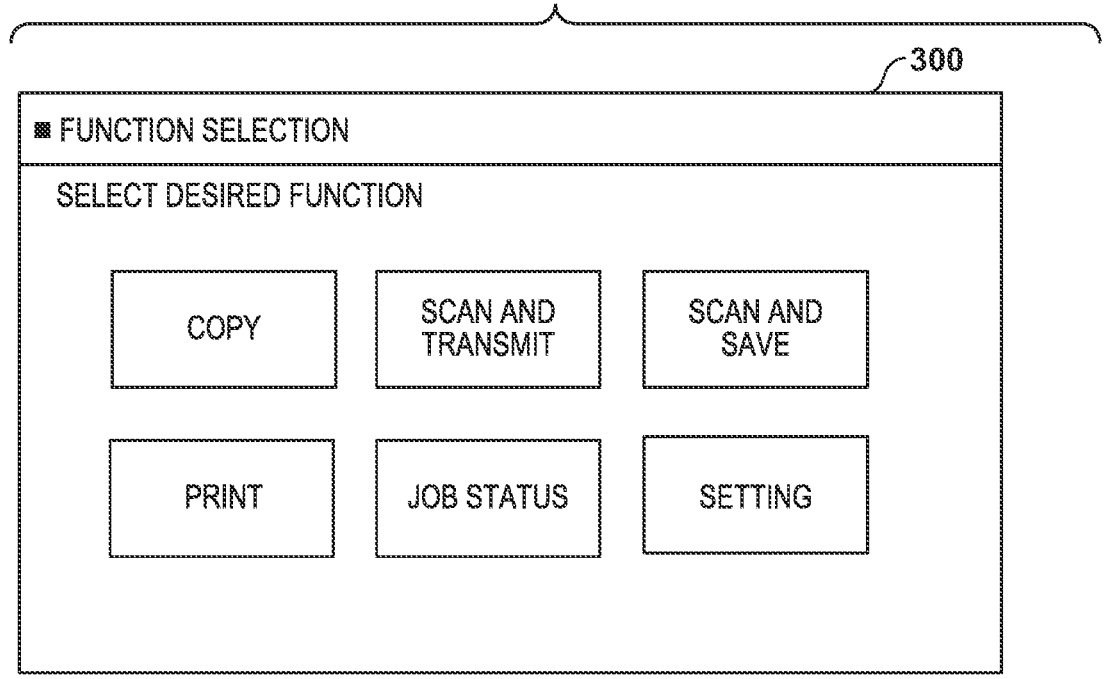
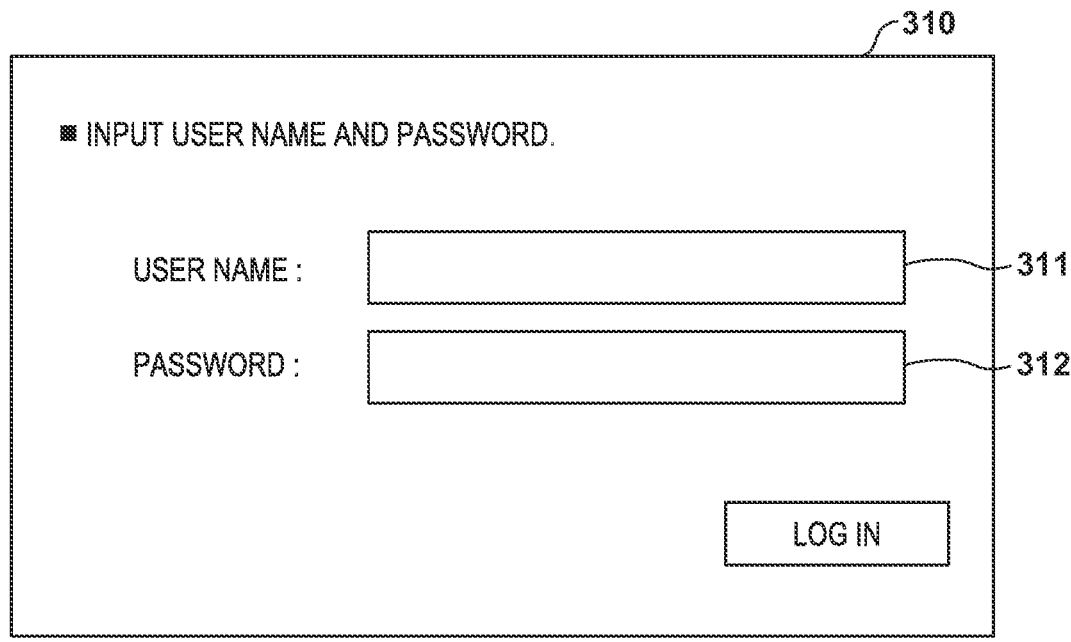

■ SETTING > AUTHENTICATION SETTING

SET FUNCTION THAT REQUIRES AUTHENTICATION

| | | |
|---|---|---|
| COPY: | ○ ON | ● OFF |
| SCAN AND TRANSMIT : | ● ON | ○ OFF |
| SCAN AND SAVE : | ○ ON | ● OFF |
| PRINT: | ○ ON | ● OFF |

[ OK ]   [ CANCEL ]

410

<RESTRICTIONS ON OPERATIONS ON JOBS OWNED BY USER OTHER THAN AUTHENTICATED USER>

| | | |
|---|---|---|
| COPY | ON | OFF |
| PRINT | ON | OFF |
| TRANSMIT | ON | OFF |
| SAVE | ON | OFF |

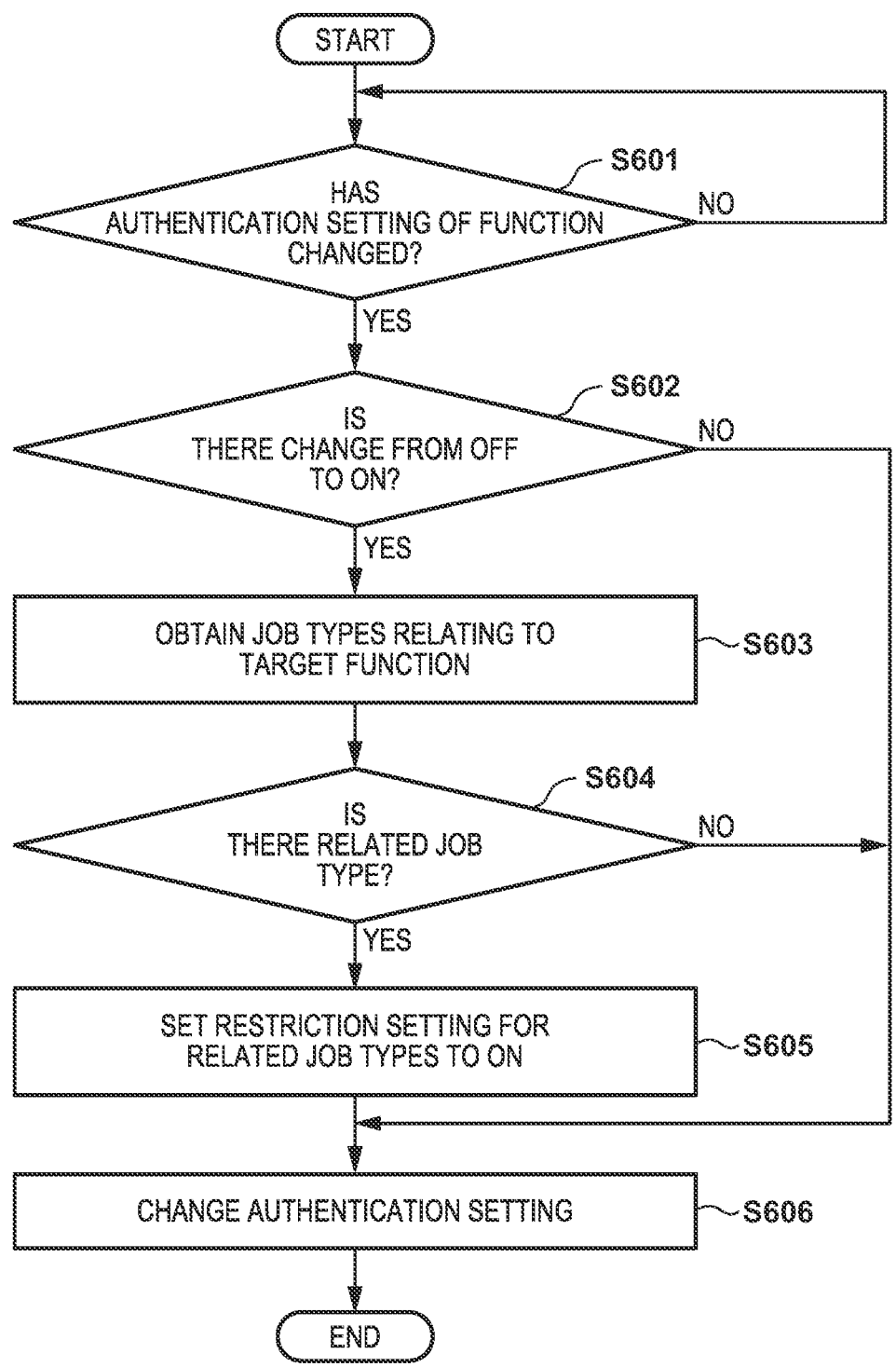

FIG. 7A

USER INFORMATION

| USER NAME | PASSWORD | ROLE |
|---|---|---|
| user1 | abcd | Administrator |
| user2 | efgh | General User |
| user3 | ijkm | General User |

FIG. 7B

AUTHENTICATION SETTING

| FUNCTION | WHETHER TO AUTHENTICATE |
|---|---|
| COPY | OFF |
| SCAN AND TRANSMIT | ON |
| SCAN AND SAVE | OFF |
| PRINT | OFF |

FIG. 7C

JOB USAGE INFORMATION

| FUNCTION | JOB TYPES USED |
|---|---|
| ALL FUNCTION | COPY, PRINT, TRANSMISSION, SAVE |
| COPY | COPY, PRINT |
| SCAN AND TRANSMIT | TRANSMIT |
| SCAN AND SAVE | SAVE |
| PRINT | PRINT |

F I G. 7D

RESTRICTION SETTING

| JOB TYPES | RESTRICTION OF OPERATION ON JOB |
|---|---|
| COPY | OFF |
| TRANSMIT | ON |
| SAVE | OFF |
| PRINT | OFF |

F I G. 7E

AUTHENTICATION SETTING (AFTER CHANGE)

| FUNCTION | WHETHER TO AUTHENTICATE |
|---|---|
| COPY | OFF |
| SCAN AND TRANSMIT | ON |
| SCAN AND SAVE | ON |
| PRINT | OFF |

F I G. 7F

RESTRICTION SETTING (AFTER CHANGE)

| JOB TYPES | RESTRICTION OF OPERATION ON JOB |
|---|---|
| COPY | OFF |
| TRANSMIT | ON |
| SAVE | ON |
| PRINT | OFF |

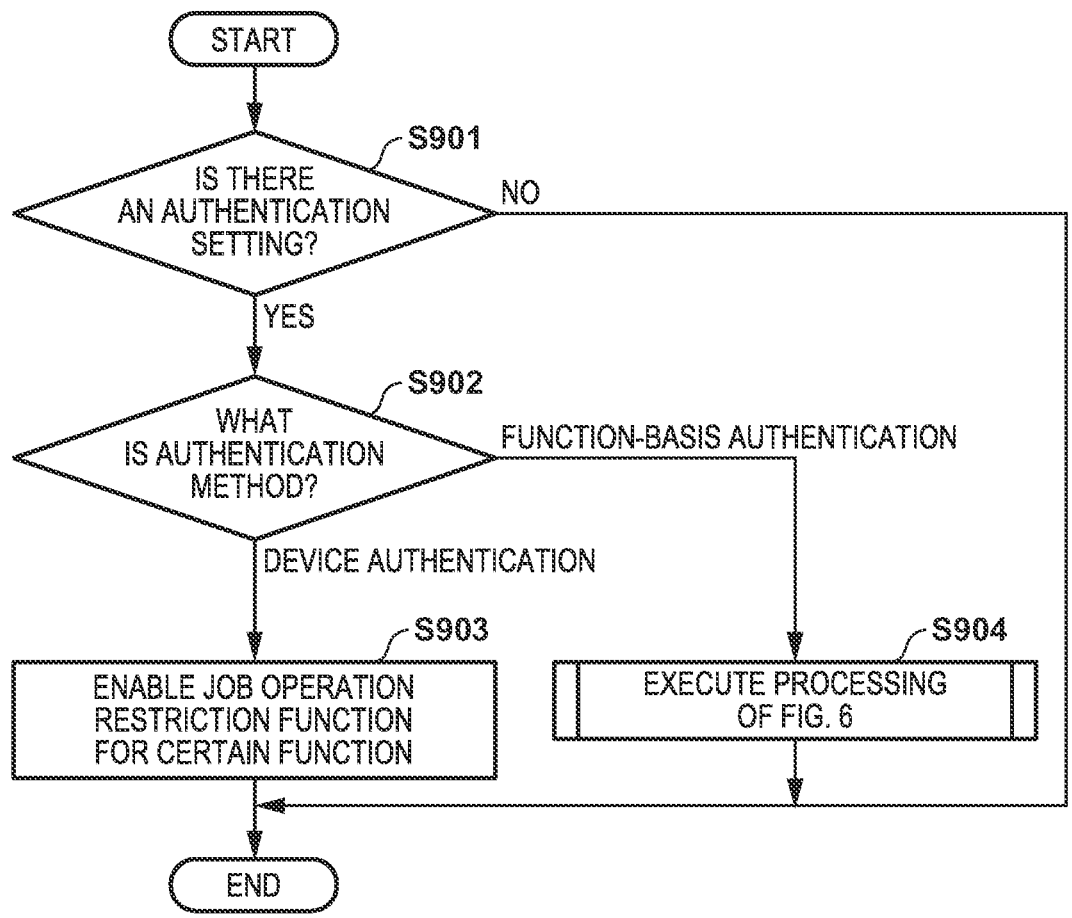

INFORMATION PROCESSING APPARATUS, METHOD OF CONTROLLING THE SAME AND STORAGE MEDIUM

BACKGROUND OF THE INVENTION

Field of the Invention

The present invention relates to an information processing apparatus, a method of controlling the same, and a storage medium.

Description of the Related Art

In an image forming apparatus provided with a user authentication function, it is possible to restrict usage by users who are not authenticated users. As such a user authentication function, a function that requires user authentication only when a specific function that the image forming apparatus has is to be used (referred to as "function-basis authentication") has been realized. When function-basis authentication is performed, while a copy function, for example, can be used by anyone without user authentication, from a security perspective, it is possible to perform user authentication when a transmission function is to be used to transmit image data obtained by scanning to an external apparatus. Consequently, it is possible to restrict users who are able to use the transmission function to only permitted users.

In addition, in an image forming apparatus that can display a job execution status or history, from a security or privacy protection perspective, there are cases of restricting operations or information display regarding a job owned by a user other than a logged-in user. For example, Japanese Patent Laid-Open No. 2015-155159 proposes a technique for controlling (permitting or prohibiting) display of information for a job corresponding to a user who is not logged-in, for each type of job.

In the foregoing conventional technique, it is possible to perform, for each type of job, a setting for restricting an operation or information display regarding a job corresponding to a user other than a logged-in user. However, setting effort is incurred for an administrator user if it is necessary to perform such a job restriction setting separately from a setting for whether to enable an authentication function. Here, an authentication function comprises device authentication for performing user authentication before causing a function selection screen to be displayed, in addition to the function-basis authentication described above.

In an example of function-basis authentication, an administrator users may need to set a function for applying function-basis authentication, and additionally ascertain a type of job that this function uses and perform the restriction setting described above for jobs of this type. Accordingly, if an appropriate setting is not made, a situation in which, despite limiting users who can use a certain function (for example, a transmission function) to a specific user, another user is able to perform an operation with respect to a job related to the function (for example, a transmission job) may occur. This leads to a decrease in the level of security or privacy protection.

SUMMARY OF THE INVENTION

The present invention was conceived in view of the above described issues. The present invention provides a technique for, in an information processing apparatus such as an image forming apparatus, automatically performing a setting for operation restriction for a job, in combination with a setting relating to application of user authentication.

According to one aspect of the present invention, there is provided an information processing apparatus comprising: a first setting unit configured to set whether or not to require user authentication in order for a function of the information processing apparatus to be used; a second setting unit configured to perform, in association with a job type, a restriction setting for restricting a logged-in user from performing an operation with respect to a job corresponding to a user other than the logged-in user; and a control unit configured to perform control for enabling the restriction setting for a certain job type in response to the first setting unit performing a setting for requiring the user authentication.

According to another aspect of the present invention, there is provided a method of controlling an information processing apparatus, the method comprising: setting whether or not to require user authentication in order for a function of the information processing apparatus to be used; performing, in association with a job type, a restriction setting for restricting a logged-in user from performing an operation with respect to a job corresponding to a user other than the logged-in user; and performing control for enabling the restriction setting for a certain job type in response to a setting for requiring the user authentication being performed.

According to still another aspect of the present invention, there is provided a non-transitory computer-readable storage medium storing a computer program for causing a computer to execute a method of controlling an information processing apparatus, the method comprising: setting whether or not to require user authentication in order for a function of the information processing apparatus to be used; performing, in association with a job type, a restriction setting for restricting a logged-in user from performing an operation with respect to a job corresponding to a user other than the logged-in user; and performing control for enabling the restriction setting for a certain job type in response to a setting for requiring the user authentication being performed.

By virtue of the present invention, in an information processing apparatus, it is possible to automatically perform a setting for operation restriction for a job, in combination with a setting relating to application of user authentication.

Further features of the present invention will become apparent from the following description of exemplary embodiments (with reference to the attached drawings).

BRIEF DESCRIPTION OF THE DRAWINGS

FIG. 1 is a view for illustrating a hardware configuration of an MFP.

FIG. 2 is a view for illustrating a software configuration of an MFP.

FIG. 3 is a view for illustrating an example of a function selection screen and an authentication screen that are displayed on an operation unit.

FIG. 4 is a view for illustrating an example of a setting screen that is displayed on the operation unit.

FIG. 6 is a flowchart for illustrating a procedure of processing for changing a job operation restriction setting.

FIGS. 7A through 7F are views for illustrating examples of information and settings that are held in the MFP.

FIG. 9 is a flowchart for illustrating a procedure of processing for changing a job operation restriction setting according to the authentication setting.

DESCRIPTION OF THE EMBODIMENTS

Figure 5:
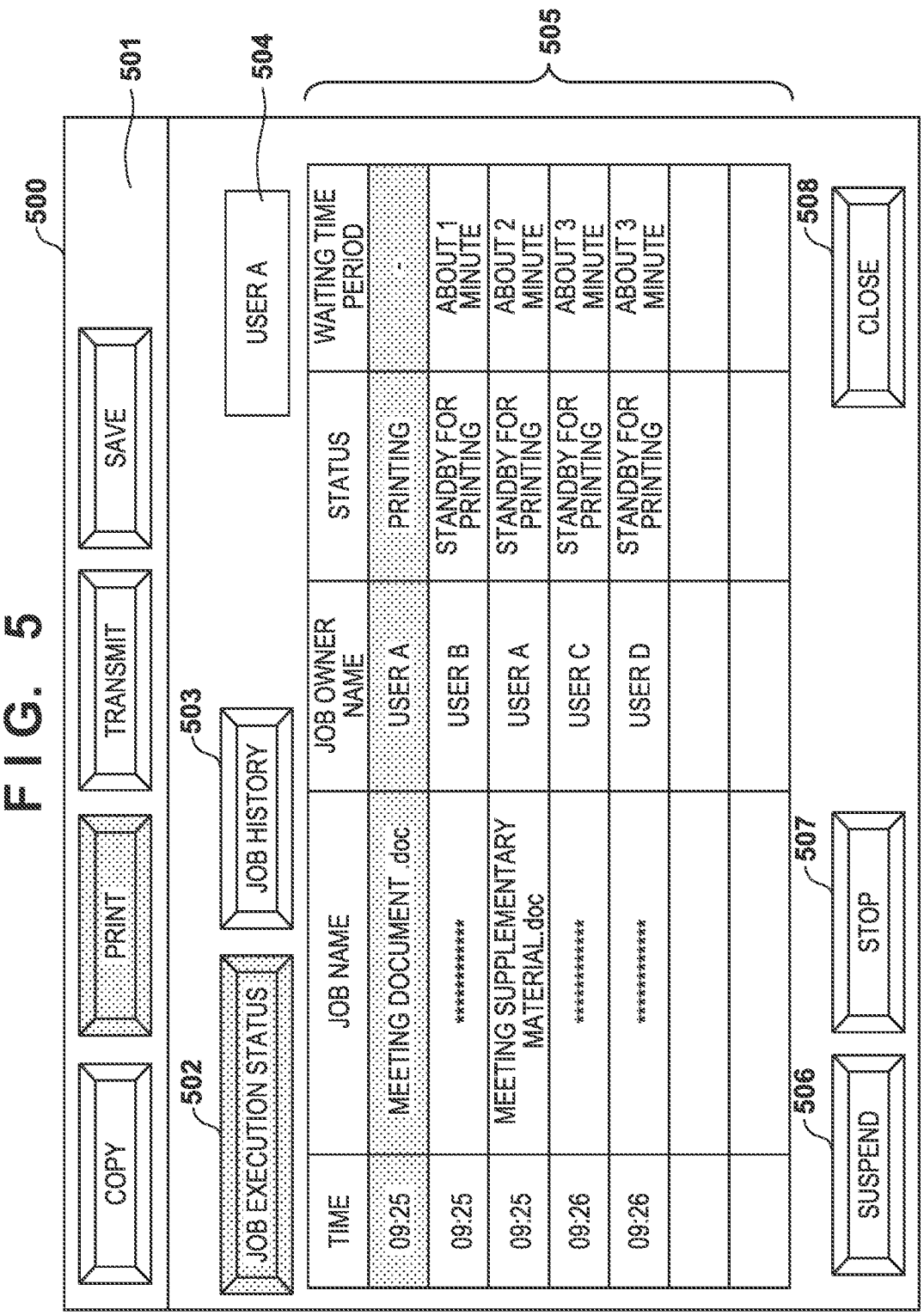
FIG. 5 is a view for illustrating an example of a job status screen that is displayed on the operation unit.

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<MFP Hardware Configuration>

FIG. 1 is a block diagram for illustrating an example of a hardware configuration of a multifunction peripheral (MFP) which is an example of an information processing apparatus (an image forming apparatus) according to the present embodiment. The MFP 100 is provided with a control unit 120, and an operation unit 109, a printer 110, and a scanner 111 that are connected to the control unit 120. The control unit 120 is provided with a CPU 101, a ROM 102, a RAM 103, an HDD (hard disk drive) 104, an operation unit I/F (interface) 105, a printer I/F 106, a scanner I/F 107, and a network I/F 108.

The CPU 101 (the control unit 120) control operation of the entirety to the MFP 100. The CPU 101 reads and executes a control program stored in the ROM 102 to thereby perform various control such as reading control or transmission control. The RAM 103 is used as a temporary storage region such as a work area or a main memory of the CPU 101, and is a volatile memory. The HDD 104 is a non-volatile storage apparatus that stores various programs, image data, and various data that is described later.

The operation unit I/F 105 is an interface for connecting the operation unit 109 and the control unit 120. The operation unit 109 is provided with a liquid crystal display unit that has a touch panel function, and displays various screens. A user can input an instruction or information to the MFP 100 via the operation unit 109.

The printer I/F 106 is an interface for connecting the printer 110 with the control unit 120. Image data used for print processing by the printer 110 is transmitted to the printer 110 from the control unit 120 via the printer I/F 106. The printer 110 prints an image to a print medium such as a sheet, based on image data received from the control unit 120.

The scanner I/F 107 is an interface for connecting the scanner 111 and the control unit 120. The scanner 111 reads an image of an original to generate image data, and inputs the generated image data into the control unit 120 via the scanner I/F 107.

The network I/F 108 is for connecting the control unit 120 (the MFP 100) to a LAN 130. The network I/F 108 is capable of communicating with an external apparatus via the LAN 130, and can transmit image data or various information to an external apparatus, and receive image data (print data) or various information from an external apparatus.

<MFP Software Configuration>

FIG. 2 is a block diagram that illustrates an example of a software configuration of the MFP 100, and illustrates a configuration related to the present embodiment. The function of each functional block illustrated in FIG. 2 is realized by the CPU 101 reading out and executing a control program stored in the ROM 102 or the HDD 104.

A UI (user interface) control unit 200 provides a function for controlling the operation unit 109 via the operation unit I/F 105. The UI control unit 200 notifies details of an operation made on the operation unit 109 by a user to an authentication processing unit 201 or a job information management unit 202. In addition, upon receiving a screen display request from the authentication processing unit 201 or the job information management unit 202, the UI control unit 200 performs display control for displaying a screen on the operation unit 109. The authentication processing unit 201 or the job information management unit 202 normally displays a screen on the operation unit 109 via the UI control unit 200.

The authentication processing unit 201 provides a function for authenticating a user who uses the MFP 100. The authentication processing unit 201 displays, on the operation unit 109, an operation screen (an authentication screen 310 illustrated in FIG. 3) for accepting input of user information for user authentication. The authentication processing unit 201 accepts input of a user name and password, as user information, from a user via the authentication screen 310. The authentication processing unit 201 compares the user information inputted via the authentication screen 310 with user information held within a user information DB 205 to thereby perform user authentication. With such a configuration, the authentication processing unit 201 performs user authentication for a user who logs into the MFP 100.

The user information DB (database) 205 provides a function for holding user information which is information relating to users who use the MFP 100. The user information DB 205 is constructed within the HDD 104, and information stored in the user information DB 205 is saved in the HDD 104.

FIG. 7A illustrates an example of user information that is held inside the user information DB 205. The user information is configured by a user name, a password, and a role. The user name is a name for uniquely identifying a user. The password is used in user authentication, and can be set to an arbitrary value for each user. The role corresponds to an authority granted to a user of the MFP 100. In the MFP 100 of the present embodiment, there are two roles: "Administrator" and "General User". "Administrator" is a role that is assigned to an administrator user of the MFP 100, and "General User" is a role assigned to a general user who uses the MFP 100.

The authentication processing unit 201 can perform a function restriction in accordance with a role of a user who is logged into the MFP 100 (a logged-in user). For example, for a reason in terms of security, the authentication processing unit 201 only provides administrator users with a setting screen 400 (FIG. 4) which relates to a user authentication function, and a setting screen 410 (FIG. 4) which relates to job display and operation restriction. In other words, function restriction in accordance with user roles is performed in order to only permit an administrator user to perform a setting using the setting screen 400 or 410.

In the present embodiment, it is possible to set either of a time when a user starts to operate the MFP 100 or a time when a user has selected a respective function provided on the MFP 100 as a timing for when the authentication processing unit 201 performs authentication. Authentication at a time when a user starts operation of the MFP 100 specifically means performing authentication before the user selects a respective function of the MFP 100. The functions of the MFP 100 include functions such as copying, "scan and transmit", "scan and save", printing, for example. Below, an authentication method for performing authentication before a user selects a respective function of the MFP 100 may be referred to as "device authentication", and an authentication method for performing authentication when a user has selected a function of the MFP 100 may be referred to as "function-basis authentication".

Figure 8A:
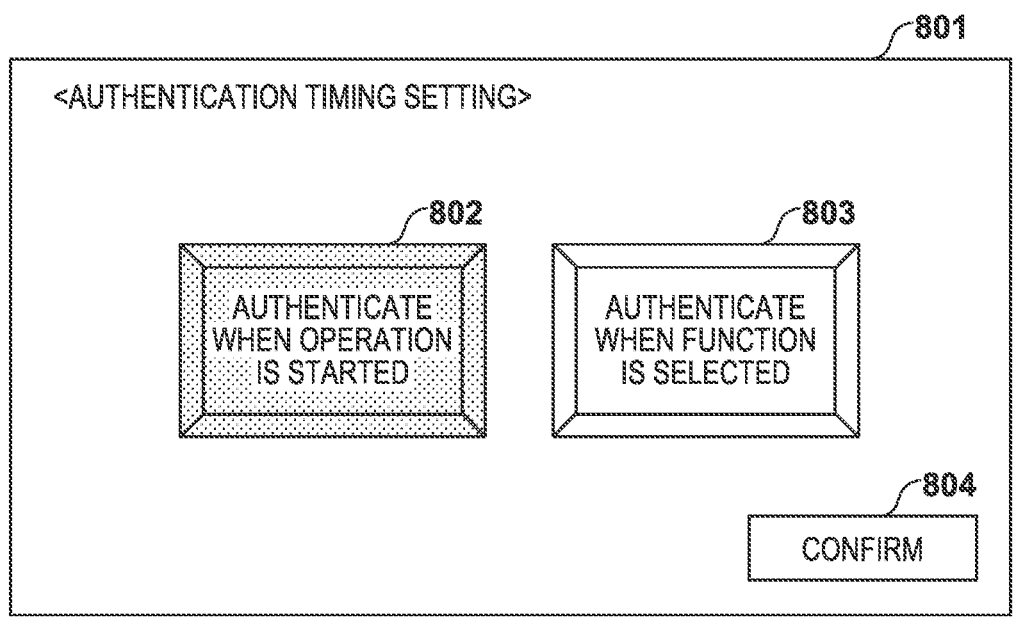
FIGS. 8A and 8B are views for illustrating examples of a selection screen for an authentication method, and a setting screen that are displayed on the operation unit.

An example of a setting screen is illustrated in FIG. 8A. For example, an administrator of the MFP 100 can use the setting screen illustrated in FIG. 8A to set a timing for when to perform authentication. It is possible to have the setting screen of FIG. 8A be a setting screen that can only be operated by an administrator, for example. When an administrator selects a button 802 and selects a confirmation button 804, device authentication is set. In contrast, when an administrator selects a button 803 and then selects the confirmation button 804, function-basis authentication is set.

If a time when operation of the MFP 100 is started (device authentication) is set as the authentication timing, until authentication succeeds, the MFP 100 causes a display unit of the operation unit 109 to display a screen for prompting the execution of user authentication, or a screen for performing user authentication. When authentication in accordance with a user ID and password or authentication using an IC card succeeds, a function selection screen 300 for selecting functions of the MFP 100 is displayed. In contrast, if a time of function selection (function-basis authentication) is set as the authentication timing, the function selection screen 300 is displayed without authentication, in response to a user operation when the MFP 100 is in a standby state. If a particular function out of the functions displayed on the function selection screen 300 is selected, the authentication processing unit 201 then performs authentication.

If device authentication is set, the authentication processing unit 201 performs the user authentication as necessary, in accordance with a setting held within an authentication setting DB 204 when a user has performed an operation for authentication while the MFP 100 is in the standby state (a state where user authentication has not been performed). In addition, when function-basis authentication is set, the authentication processing unit 201 performs user authentication as necessary, in accordance with a setting held within the authentication setting DB 204, when a user uses a respective function provided by the MFP 100. The authentication setting DB 204 provides a function for holding settings for the user authentication function. The authentication setting DB 204 is constructed within the HDD 104, and information stored in the authentication setting DB 204 (authentication setting) is saved in the HDD 104. FIG. 7B illustrates an example of authentication settings that are held inside the authentication setting DB 204. An authentication setting is a setting that indicates the necessity of user authentication when a user uses a respective function that the MFP 100 has.

Here, the MFP 100 of the present embodiment has a copy function, a "scan and transmit" function (a transmission function), a "scan and save" function (a save function), and a print function. The copy function is a function for printing an image by the printer 110, based on image data generated by the scanner 111 reading an image of an original. The transmission function is a function for transmitting, to an external apparatus, image data generated by the scanner 111 reading an image of an original. The save function is a function for saving, on the HDD 104, image data generated by the scanner 111 reading an image of an original. The print function is a function for printing, by the printer 110, an image based on image data saved in the HDD 104 or image data received from an external apparatus.

For each function that the MFP 100 has, the authentication setting DB 204 holds a setting value ("ON" or "OFF") indicating whether user authentication is necessary when a user uses the function when function-basis authentication is set. As illustrated by FIG. 7B, "ON" is set for a function that requires user authentication, and "OFF" is set for a function that does not require user authentication. A function for which "OFF" is set can be used by all users without the performance of user authentication.

In addition, the authentication processing unit 201 provides a setting function for changing a setting held within the authentication setting DB 204. If function-basis authentication is set, the authentication processing unit 201 displays the setting screen 400 (FIG. 4) which is described later on the operation unit 109 to thereby enable an administrator user to set, for each function that the MFP 100 has, whether user authentication is necessary when a user uses the function. Upon accepting user authentication function settings from an administrator user via the setting screen 400, the authentication processing unit 201 holds the accepted settings within the authentication setting DB 204.

A job use information DB 203 provides a function for holding information (job usage information) indicating what type of job is used by each function that the MFP 100 has. The job use information DB 203 is constructed within the HDD 104, and information stored in the job use information DB 203 is saved in the HDD 104.

FIG. 7C illustrates an example of job usage information that is held inside the job use information DB 203. The job usage information is configured by functions that the MFP 100 has, and job types that each function uses. Depending on the function, there are cases of using a plurality of types of jobs, and, for example, in the example of FIG. 7C, the copy function uses copy jobs and print jobs. The transmission function uses transmission jobs. The save function uses save jobs. The print function uses print jobs. With such a configuration, the job use information DB 203 holds a plurality of functions that the MFP 100 has in association with one or more job types that each of the plurality of functions uses.

The job information management unit 202 provides a function of managing information relating to jobs that are being executed in the MFP 100 or have been finished to be executed. The job information management unit 202 displays, on the operation unit 109, a job status screen 500 (FIG. 5) for display of information on jobs that are being executed in the MFP 100 or have been finished to be executed, and for operations in relation to these jobs. Via the job status screen 500, the job information management unit 202 notifies a user of information relating to a job, and also accepts from a user an operation with respect to a job.

The job information management unit 202 also provides a setting function for performing a setting for restricting operations and information display regarding jobs owned by a user other than the logged-in user. Specifically, the job information management unit 202 displays the setting screen 410 (FIG. 4), which is described later, on the operation unit 109 to thereby enable an administrator user to perform a setting of whether to restrict operations and information display regarding a job owned by a user other than the logged-in user. Via the setting screen 410, the job information management unit 202 accepts a setting of whether to restrict operations and information display regarding a job owned by a user other than the logged-in user for each job type. The job information management unit 202 holds the settings accepted via the setting screen 410 as job operation restriction settings in a restriction setting DB 206. Configuration may be taken to, even if operation restriction is set for jobs owned by a user other than the logged-in user, permit an administrator user to perform an operation for a job owned by another user, if the administrator user is logged in.

In the job status screen 500, the job information management unit 202 restricts operations and information display regarding jobs owned by a user other a logged-in user, in accordance with the settings held within the restriction setting DB 206. The restriction setting DB 206 provides a function for holding settings indicating whether to restrict operations and information display regarding jobs owned by a user other than a user who is logged in to the MFP 100 (a logged-in user). The restriction setting DB 206 is constructed within the HDD 104, and information stored in the restriction setting DB 206 is saved in the HDD 104. FIG. 7D illustrates an example of job operation restriction settings that are held within the restriction setting DB 206. For each type of job that the MFP 100 can execute, the restriction setting DB 206 holds a restriction setting for restricting operations with respect to jobs that correspond to a user other than a logged-in user who is logged in to the MFP 100.

Here, the types of jobs that the MFP 100 of the present embodiment can execute include copy jobs, transmission jobs, save jobs, and print jobs. A copy job is a job for printing an image by the printer 110, based on image data generated by the scanner 111 reading an image of an original. A transmission job is a job for transmitting image data generated by the scanner 111 reading an image of an original to an external apparatus via the network I/F 108 (such as by an email). A save job is a job for saving, on the HDD 104, image data generated by the scanner 111 reading an image of an original. A print job is a job for printing an image by the printer 110, based on image data saved in the HDD 104 by a save job, or image data received from an external apparatus via the network I/F 108.

The restriction setting DB 206 holds, for each type of job that the MFP 100 can execute, a setting value ("ON" or "OFF") indicating whether to restrict operations and information display regarding jobs owned by a user other than the logged-in user. As illustrated by FIG. 7D, "ON" is set for job types for which restriction is to be performed, and "OFF" is set for job types for which restriction is not to be performed. For job types set to "OFF", information can be displayed and an operation by the logged-in user can be performed in relation to a job owned by a user other than the logged-in user.

<Example of Operation Screen>

Next, with reference to FIG. 3 through FIG. 5 and FIGS. 8A and 8B, description is given for examples of operation screens relating to the present embodiment, which are displayed by the operation unit 109 in the MFP 100.

(Function Selection Screen 300)

The function selection screen (menu screen) 300 illustrated in FIG. 3 is an example of an operation screen for a user to select a function to use from out of the functions provided by the MFP 100. The function selection screen 300 is displayed on the operation unit 109 immediately after the MFP 100 activates or after user authentication succeeds, for example. The function selection screen 300 displays a list of functions provided by the MFP 100. A user of the MFP 100 can press any button of a button group 301 displayed on the function selection screen 300 to thereby select a function corresponding to the pressed button.

Out of the button group 301, a "copy" button is used to make an instruction to display an operation screen for the copy function. A "scan and transmit" button is used to make an instruction to display an operation screen for the transmission function. A "scan and save" button is used to make an instruction to display an operation screen for the save function. A "print" button is used to make an instruction to display an operation screen for the print function. A "job status" button is used to make an instruction to display the job status screen 500 (FIG. 5). A "setting" button is used to make an instruction to display the setting screen 400 or the setting screen 410 (FIG. 4). Note that, in the present embodiment, description regarding operation screens relating to the copy function, the transmission function, the save function, and the print function is omitted.

(Authentication Screen 310)

An authentication screen 310 illustrated in FIG. 3 is an example of an operation screen used for user authentication for a function of the MFP 100 in order for the user to use the function. Input fields 311 and 312 included in the authentication screen 310 are used for a user of the MFP 100 to respectively input a user name and a password as user information for user authentication. When the user respectively inputs a user name and password into the input fields 311 and 312 and presses a login button, the authentication processing unit 201 executes user authentication based on the inputted user information.

(Setting Screen 400)

A setting screen 400 illustrated on FIG. 4 is an example of an operation screen for performing settings of a user authentication function when function-basis authentication is set. The setting screen 400 is a setting screen for accepting, from a user, an authentication setting for each function that the MFP 100 has of whether to require (or not require) user authentication in order to use the function. In the present example, in the setting screen 400, for each of the copy function, the transmission function, the save function, and the print function, "ON" is set for a case of requiring user authentication, and "OFF" is set for a case of not requiring user authentication.

The authentication processing unit 201 accepts authentication settings via the setting screen 400 which is displayed on the operation unit 109. Content set in the setting screen 400 is stored in the authentication setting DB 204. In accordance with the authentication settings accepted via the setting screen 400 (held within the authentication setting DB 204), the authentication processing unit 201 performs user authentication for a user when the user attempts to use a function for which requiring user authentication is set.

FIG. 4 illustrates an example of a state in the setting screen 400 where a setting for requiring user authentication at a time of usage of a function has only been made for the transmission function. In such a case, for example, immediately after the MFP 100 activates, display control is performed to display the function selection screen 300 on the operation unit 109, and display the authentication screen 310 on the operation unit 109 if the "scan and transmit" button in the function selection screen 300 is pressed. Note that configuration may be taken such that, if "ON" is set as the setting value for all functions in the setting screen 400, display control for displaying the authentication screen 310 on the operation unit 109 immediately after the MFP 100 activates is performed. Furthermore, configuration may be taken such that, if user authentication using the authentication screen 310 succeeds, display control for displaying the function selection screen 300 on the operation unit 109 is performed.

(Setting Screen 410 and Setting Screen 810)

Figure 8B:
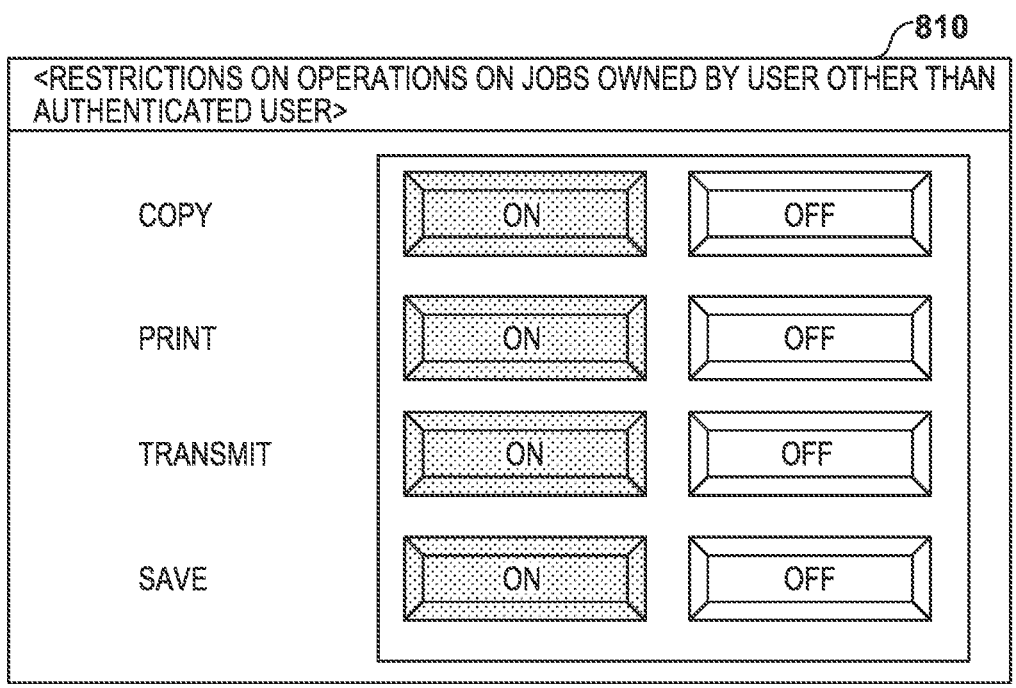

A setting screen 410 illustrated in FIG. 4 and a setting screen 810 illustrated in FIG. 8B are examples of operation screens for performing settings relating to operations and information display regarding jobs owned by a user other than a logged-in user. The setting screen 410 is an example of a setting screen for a case where function-basis authentication is set as an authentication method. In addition, the setting screen 810 is an example of a setting screen for a case where device authentication is set as an authentication method. The setting screen 410 and the setting screen 810 include a group of buttons for setting, for each job type, whether to permit (or prohibit) operations and information display regarding a job owned by a user other than a logged-in user. A function for restricting (for example, prohibiting) operations and information display regarding a job owned by a user other than the logged-in user is referred to below as a "job operation restriction function". In the examples of the setting screen 410 and the setting screen 810, by setting the job operation restriction function to enabled (ON) or disabled (OFF), whether to permit or prohibit operations and information display regarding a job of a user other than the logged-in user is set. By enabling the job operation restriction function, operation and information display for a job owned by a user other than the logged-in user is prohibited. In contrast, when the job operation restriction function is disabled, operations and information display for a job owned by a user other than the logged-in user are permitted. In the setting screen 410 and the setting screen 810, for each of copy jobs, print jobs, transmission jobs, and save jobs, the "OFF" button is selected for a case of permitting operations on a job (including information display), and the "ON" button is selected for a case of prohibiting operations.

FIGS. 8A and 8B illustrate examples of a states where "authenticate when starting an operation (device authentication)" has been selected as an authentication method. When device authentication is set, job operation restriction for copy jobs, print jobs, transmission jobs and save jobs are all automatically set to be ON as illustrated by the setting screen 810. Specifically, in conjunction with the enablement of device authentication, the job operation restriction function is set to ON for copy jobs, print jobs, transmission jobs, and save jobs. In the present embodiment, description was given regarding an example in which the job operation restriction function is set to ON for all job types, but the job operation restriction function may be set to OFF for some types.

By linking enablement of device authentication and job operation restriction settings, it is possible to automatically prevent the logged-in user from performing an operation with respect to a job of a user other than the logged-in user and strengthen security by simply enabling device authentication. However, in a case where an administrator user wishes to permit a logged-in user to execute operations with respect to a job of a user other than the logged-in user, an administrator can operate the setting screen 810 to perform such a setting.

FIG. 4 illustrates an example of a state where "authenticate when a function is selected (function-basis authentication)" has been selected as an authentication method. FIG. 4 illustrates, in the setting screen 410, a state where "ON" is set for transmission jobs and "OFF" is set for other jobs, as an example. Content set in the setting screen 410 is stored in the restriction setting DB 206. Specifically, for a function for which authentication being required is set, a setting is automatically made such that the job operation restriction becomes ON.

By linking enablement of authentication for a designated function and a job operation restriction setting for this function, for a function that requires authentication, it is possible to automatically prevent a logged-in user from performing operations with respect to a job of a user other than the logged-in user, and it is possible to strengthen security. However, in a case where an administrator user wishes to, with respect to a function that requires authentication, permit execution of operations with respect to a job of a user other than the logged-in user, an administrator can operate the setting screen 410 to perform such a setting.

(Job Status Screen 500)

The job status screen 500 illustrated in FIG. 5 is an operation screen which is displayed on the operation unit 109 by the job information management unit 202 and is for operations on jobs that are being executed or have been finished to be executed in the MFP 100, and displays an execution status or history of jobs in the MFP 100. A button group 501 includes buttons that respectively correspond to copy jobs, print jobs, transmission jobs, and save jobs. When any button is pressed by a user, information relating to the job type corresponding to the pressed button is displayed in a display area 505.

In the job status screen 500, if a button 502 is pressed, information indicating job execution statuses is displayed in the display area 505. In such a case, information indicating the statuses of jobs being executed in the MFP 100 or jobs that are awaiting execution is displayed. In addition, if a button 503 is pressed, information indicating a job history is displayed in the display area 505. In such a case, information indicating the history of jobs that have been finished to be executed in the MFP 100 is displayed. A user name of the user who is logged in to the MFP 100 (the logged-in user) is displayed in a display area 504.

FIG. 5 is illustrated as an example where information indicating the execution statuses of print jobs are displayed in the display area 505 in a state where operation on print jobs has been prohibited in the setting screen 410 (job operation restriction for print jobs has been enabled). Within the display area 505, times when each job was accepted, job names and user names corresponding to each job, the execution status of each job, and a waiting time until execution of each job is started are displayed. A button 506 is used to make an instruction to suspend execution of a job that is currently selected in the display area 505. A stop button 507 is used to make an instruction to stop execution of a job that is currently selected in the display area 505. A button 508 is used to make an instruction to end display of the job status screen 500.

In accordance with restriction settings held in the restriction setting DB 206, the job information management unit 202 restricts operations with respect to jobs that correspond to a user other than a logged-in user, in the job status screen 500 displayed on the operation unit 109. More specifically, the job information management unit 202 performs display control of the job status screen 500 so that, from out of the one or more jobs displayed in the job status screen 500, operations with respect to a job corresponding to a user other than the logged-in user cannot be performed.

FIG. 5 illustrates a screen that is displayed in a case where a user having "user A" as a user name is logged in, and illustrates a state where a print job that is currently being executed is selected. In this state, when the user presses the button 506, execution of the selected print job will be suspended. In addition, when the user presses the stop button 507, execution of the selected print job will be stopped.

In addition, because operations on print jobs owned by a user other than the logged-in user are prohibited as described above, in the display area 505 illustrated in FIG. 5, mask processing has been performed with respect to job names corresponding to a user B and a user C who are not the user A. With such a configuration, in the job status screen 500, the job information management unit 202 restricts display of information regarding jobs corresponding to a user other than the logged-in user (the user A) from out of information of jobs that are being executed or have been finished to be executed. In this state, display control is performed so that the logged-in user (the user A) cannot operate the button 506 and the button 507 even if they have selected a job corresponding to a job name for which mask processing has been performed.

<Processing Flow>

Next, with reference to the flowchart of FIG. 9, description is given regarding processing for changing a restriction setting for operations on jobs, in accordance with a user authentication setting. The processing in accordance with the procedure illustrated in FIG. 9 is realized, as a function of the authentication processing unit 201, by the CPU 101 reading a control program stored in a storage apparatus such as the ROM 102 or the HDD 104 into the RAM 103 and executing the control program.

In step S901, the CPU 101 determines whether an authentication setting has been made. If an authentication setting has not been made, the processing ends. Specifically, if neither of a device authentication setting and a function-basis authentication setting has been enabled, processing to change a job restriction setting in conjunction with an authentication setting is not executed.

If an authentication setting has been made (YES in step S901), the CPU 101 determines whether the authentication method is device authentication or function-basis authentication (step S902).

Upon determining in step S902 that the authentication method is device authentication, the CPU 100 enables the job operation restriction function for certain functions (step S903). For example, in the example illustrated in FIG. 8B, the job operation restriction is enabled for the copy function, the print function, the transmission function, and the save function. In the present embodiment, description is given for an example in which the job operation restriction is enabled for all functions, but there is no limitation to this. Configuration may be taken such that, even if device authentication is set, job operation restriction is not enabled for a specific function.

In contrast, upon determining in step S902 that the authentication method is function-basis authentication, the CPU 100 performs processing to be described later using FIG. 6 (step S904).

Upon executing the processing of step S903 or step S904, the CPU 100 ends this processing flow.

Next, with reference to the flowchart of FIG. 6, description is given regarding processing for changing a restriction setting for operations on jobs, in accordance with a user authentication setting, if function-basis authentication is set. The processing in accordance with the procedure illustrated in FIG. 6 is realized, as a function of the authentication processing unit 201, by the CPU 101 reading a control program stored in a storage apparatus such as the ROM 102 or the HDD 104 into the RAM 103 and executing the control program.

After the MFP 100 is activated from a power OFF state, the CPU 101 (the authentication processing unit 201) displays the setting screen 400 on the operation unit 109 in response to a request from the UI control unit 200, and then executes processing in accordance with the procedure illustrated in FIG. 6. It is assumed here that, when the processing in accordance with the procedure illustrated in FIG. 6 is started, the authentication settings illustrated in FIG. 7B have been saved to the authentication setting DB 204, and the restriction settings illustrated in FIG. 7D have been saved to the restriction setting DB 206.

In step S601, the CPU 101 waits until an authentication setting for one or more function is changed in the setting screen 400. Specifically, if the OK button is pressed after setting values of one or more functions displayed on the setting screen 400 are changed, the CPU 101 advances the processing to step S602, and otherwise repeats the processing of step S601. Note that, if the cancel button in the setting screen 400 is pressed or the OK button is pressed without the setting value of any function being changed, the CPU 101 ends the processing in accordance with the procedure illustrated in FIG. 6.

In step S602, the CPU 101 determines whether the setting values for one or more functions has changed from "OFF" to "ON", and advances the processing to step S603 if a change from "OFF" to "ON" has been performed, and otherwise advances the processing to step S606. In the present example, it is assumed that, in the setting screen 400, the setting value for the save function has been changed by an administrator user from "OFF" to "ON".

In step S603, the CPU 101 obtains a job type relating to a target function whose authentication setting was changed to require user authentication when there is usage of the function by a user, by its setting value being changed from "OFF" to "ON". Specifically, the CPU 101 refers to the job use information DB 203 to obtain a job type that the target function uses. In the present example, by the setting value of the save function being changed from "OFF" to "ON", as illustrated by FIG. 7C, "save job" is obtained as the job type used by the save function.

Next, in step S604, if the CPU 101 was able to obtain one or more job types relating to the target function, the CPU 101 advances the processing to step S605, and if the CPU 101 was not able to obtain even one related job type, the CPU 101 advances the processing to step S606.

In step S605, the CPU 101 sets the setting value of the restriction setting for the obtained job type within the restriction setting DB 206 to "ON" (in other words, performs a setting for restricting operations and information display for a job owned by a user other than a logged-in user). With such a configuration, the CPU 101 performs a restriction setting for the job type obtained in step S603, in conjunction with accepting, via the setting screen 400, an authentication setting for whether user authentication for usage of a corresponding function that the MFP 100 has is required. In the present example, the CPU 101 sets the setting value corresponding to save jobs in the restriction setting DB 206 to "ON". In other words, the restriction settings inside the restriction setting DB 206 are changed from the settings indicated in FIG. 7D to the settings indicated in FIG. 7F. When the setting of step S605 completes, the CPU 101 advances the processing to step S606.

In step S606, the CPU 101 reflects the change of the authentication setting performed in step S601 to the authentication setting DB 204, and ends the processing. In the present example, the CPU 101 changes the setting value corresponding to the save function in the authentication setting DB 204 from "OFF" to "ON". In other words, the authentication settings inside the authentication setting DB 204 are changed from the settings indicated in FIG. 7B to the settings indicated in FIG. 7E.

Note that, in the processing described above, if a setting value inside the authentication setting DB 204 is changed from "OFF" to "ON", the setting value inside the restriction setting DB 206 that corresponds to the job type used by the target function is set to "ON". In addition to this processing, the following processing may be executed if a setting value for an authentication setting inside the authentication setting DB 204 is changed from "ON" to "OFF". In other words, if a job type used by a target function is not used by other functions, processing to set the setting value inside the restriction setting DB 206 corresponding to the job type used by the target function to "OFF" may be executed. With such a configuration, if an authentication setting change from a setting that requires the user authentication to a setting that does not require user authentication is accepted, a restriction setting may be canceled for job types that relate to a function for which the authentication setting was changed and are not related to other functions.

As described above, in the MFP 100 of the present embodiment, the CPU 101 accepts, from a user, an authentication setting of whether to require user authentication to enable someone to use each function that the MFP has. In accordance with a setting for requiring user authentication being made, the CPU 101 performs control to enable, for certain job types, a restriction setting for restricting a logged-in user from performing operations with respect to jobs corresponding to a user other than the logged-in user.

In addition, if function-basis authentication is set as the authentication method for user authentication, the CPU 101, via the setting screen 400, accepts from a user an authentication setting, for each function that the MFP 100 has, of whether to require user authentication in order to use the function. From out of job types that can be executed in the MFP, the CPU 101 obtains a job type related to a function for which requiring user authentication has been set in accordance with the accepted authentication setting. Furthermore, for each obtained job type, the CPU 101 performs a restriction setting for restricting operations with respect to jobs that correspond to a user other than a logged-in user who is logged in to the MFP 100.

According to the above processing, it is possible to automatically perform a job operation restriction setting in combination with a user authentication setting. In other words, there ceases to be a need for an administrator user to separately perform a user authentication setting and a job operation restriction setting, and it is possible to eliminate setting effort for an administrator user. In addition, because the job operation restriction setting is automatically performed in conjunction with a setting for requiring user authentication, it is possible to prevent a reduction of a level of security or privacy protection arising due to a deficient setting by an administrator user.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-045926, filed Mar. 13, 2018 which is hereby incorporated by reference herein in its entirety.

What is claimed is:

1. An image forming apparatus having at least two image processing functions, comprising:
    at least one processor; and
    at least one memory coupled to the at least one processor and having stored thereon instructions which, when executed by the at least one processor, cause the at least one processor to function as
        a first activation unit configured to switch, from an inactive state to an active state, a predetermined authentication function that cancels, by performing based on inputted authentication information, a usage restriction for at least one image processing function of the image forming apparatus and;
        a second activation unit configured to switch, from an inactive state to an active state, a job operation restriction function that imposes a restriction on performing, by an authenticated user, an operation with respect to a job of a user that has not logged in,
    wherein in accordance with accepting from a user a setting for activating the authentication function, the first activation unit switches the authentication function from the inactive state to the active state, and the second activation unit switches the job operation restriction function with respect to the first and second image processing functions of the at least two image processing functions from the inactive state to the active state at a timing of accepting the user setting for activating the authentication function.

2. The image forming apparatus according to claim 1, wherein the instructions further cause the at least one processor to function as:
    an obtainment unit configured to obtain, from types of jobs that can be executed in the image forming apparatus, a job type relating to a function predetermined for authentication function in accordance with the acceptance of the user setting for activating the authentication function,
    wherein the second activation unit switches from the inactive state to the active state, for jobs of the obtained job type, the job operation restriction function with respect to a job corresponding to a user that has not logged in.

3. The image forming apparatus according to claim 2, wherein the instructions further cause the at least one processor to function as:
- a holding unit configured to hold a plurality of image processing functions that the image forming apparatus has in association with one or more job types that are used by each of the plurality of image processing functions,
- wherein the obtainment unit obtains, from the holding unit, a job type used by the image processing function predetermined for the authentication function.

4. The image forming apparatus according to claim 2, wherein the authentication function performs:
- user authentication for a user who logs in to the image forming apparatus,
- wherein the instructions further cause the at least one processor to function as a display control unit that displays, on a display unit of the image forming apparatus, an operation screen for operations on jobs that are being executed or have been finished to be executed in the image forming apparatus, and
- wherein, in accordance with the job operation restriction function being in the active state, the display control unit restricts an operation with respect to a job that corresponds to a user that has not logged in, in the operation screen.

5. The image forming apparatus according to claim 4, wherein, in the operation screen, the display control unit restricts display of information regarding a job corresponding to a user that has not logged in, from out of information of the jobs that are being executed or have been finished to be executed.

6. The image forming apparatus according to claim 4, wherein the display control unit performs display control of the operation screen so as to disable an operation with respect to a job corresponding to a user that has not logged in, from out of one or more jobs displayed in the operation screen.

7. The image forming apparatus according to claim 4, wherein, in a case where the authentication function is in the active state, the authentication function performs the user authentication when operation of the image forming apparatus by a user is started.

8. The image forming apparatus according to claim 2, wherein the instructions further cause the at least one processor to function as a display control unit that displays, on a display unit of the image forming apparatus, a setting screen for setting, for each image processing function that the image forming apparatus has, whether or not to require user authentication in accordance with the acceptance of the user setting for activating the authentication function.

9. A method of controlling an image forming apparatus having at least two image processing functions, the method comprising:
- a first activation that switches, from an inactive state to an active state, a predetermined authentication function that cancels, by performing based on inputted authentication information, a usage restriction for at least one image processing function of the image forming apparatus and;
- a second activation that switches, from an inactive state to an active state, a job operation restriction function that imposes a restriction on performing, by an authenticated user, an operation with respect to a job of a user that has not logged in,
- wherein in accordance with accepting from a user a setting for activating the authentication function, the first activation switches the authentication function from the inactive state to the active state, and the second activation switches the job operation restriction function with respect to the first and second image processing functions of the at least two image processing functions from the inactive state to the active state at a timing of accepting the user setting for activating the authentication function.

10. A non-transitory computer-readable storage medium storing a computer program for causing a computer to execute a method of controlling an image forming apparatus having at least two image processing functions, the method comprising:
- a first activation that switches, from an inactive state to an active state, a predetermined authentication function that cancels, by performing based on inputted authentication information, a usage restriction for at least one image processing function of the image forming apparatus and;
- a second activation that switches, from an inactive state to an active state, a job operation restriction function that imposes a restriction on performing, by an authenticated user, an operation with respect to a job of a user that has not logged in,
- wherein in accordance with accepting from a user a setting for activating the authentication function, the first activation switches the authentication function from the inactive state to the active state, and the second activation switches the job operation restriction function with respect to the first and second image processing functions of the at least two image processing functions from the inactive state to the active state at a timing of accepting the user setting for activating the authentication function.

11. An image forming apparatus having at least two image processing functions, comprising:
- at least one processor; and
- at least one memory coupled to the at least one processor and having stored thereon instructions which, when executed by the at least one processor, cause the at least one processor to function as
- a first activation unit configured to switch, from an inactive state to an active state, a predetermined authentication function that cancels, by performing based on inputted authentication information, a usage restriction for at least one image processing function of the image forming apparatus; and
- a second activation unit configured to switch, from an inactive state to an active state, a job operation restriction function that imposes a restriction on performing, by an authenticated user, an operation with respect to jobs of users other than a user that has logged in,
- wherein in accordance with accepting from a user a setting for activating the authentication function, the first activation unit switches the authentication function from the inactive state to the active state, and the second activation unit switches the job operation restriction function with respect to the first and second image processing functions of the at least two image processing functions from the inactive state to the active state, in accordance with accepting the user setting for activating the authentication function.

* * * * *